United States Patent [19]

Duh

[11] Patent Number: 5,408,035

[45] Date of Patent: Apr. 18, 1995

[54] SOLID STATE POLYMERIZATION

[75] Inventor: Ben Duh, Tallmadge, Ohio

[73] Assignee: Shell Oil Company, Houston, Tex.

[21] Appl. No.: 87,446

[22] Filed: Jul. 2, 1993

Related U.S. Application Data

[63] Continuation-in-part of Ser. No. 777,040, Oct. 16, 1991, abandoned.

[51] Int. Cl.[6] ............................ C08F 6/00; C08G 63/02
[52] U.S. Cl. ..................................... 528/480; 528/272; 528/308.1; 528/308.2; 528/481; 528/483
[58] Field of Search ............... 528/480, 481, 483, 272, 528/308.1, 308.2

[56] References Cited

U.S. PATENT DOCUMENTS

| | | | |
|---|---|---|---|
| 3,544,525 | 12/1970 | Balint et al. | 528/483 |
| 3,634,359 | 1/1972 | Breitschaat et al. | 528/308.3 |
| 3,728,309 | 4/1973 | Maxion | 528/481 |
| 3,756,990 | 9/1973 | Jaeger et al. | 528/481 |
| 3,969,324 | 7/1976 | Berkau et al. | 528/481 |
| 4,064,112 | 12/1977 | Rothe et al. | 528/272 |
| 4,161,578 | 7/1979 | Herron | 528/272 |
| 4,238,593 | 12/1980 | Duh | 528/272 |
| 4,263,425 | 4/1981 | Rothe et al. | 528/309 |
| 4,374,975 | 2/1983 | Duh | 528/272 |
| 4,532,319 | 7/1985 | Wendling | 528/274 |
| 4,876,326 | 10/1989 | Rinehart | 528/272 |
| 4,957,945 | 9/1990 | Cohn | 521/182 |
| 4,977,196 | 12/1990 | Scannapieco | 521/182 |

FOREIGN PATENT DOCUMENTS 1251093 10/1969 United Kingdom .
1277810 10/1969 United Kingdom .

*Primary Examiner*—John Kight, III
*Assistant Examiner*—Terressa Mosley

[57] ABSTRACT

This invention is a process for solid state polymerization of polyester using multiple reactors in series to achieve molecular weight increases, as measured by intrinsic viscosity, in excess of 0.25 dl/g with low levels of undesirable by-products.

39 Claims, 1 Drawing Sheet

3,408,035

SOLID STATE POLYMERIZATION

RELATED APPLICATIONS

This application is a continuation-in-part of application Ser. No. 777,040 filed Oct. 16, 1991, now abandonment.

BACKGROUND

This invention relates to a continuous process for solid state polymerization of polyesters in a moving bed reactor process.

High molecular weight polyesters are commonly produced from low molecular weight polyesters of the same compositions (polyester prepolymers) by solid state polymerization of pellets or chips (granules) made in a continuous moving-bed or static bed process (so called because the polymer bed is not fluidized).

In a continuous moving-bed process, polymerization is carried out at temperatures above the prepolymer glass transition temperature but below the melting point of the polyester resin. Polyester prepolymer is fed into the top of a solid state polymerization reactor in which it moves down by gravity in contact with a stream of preheated purge gas. The gas primarily functions to carry off unwanted by-products such as glycols, water and acetaldehyde. Polymerization proceeds as the polyester moves through the reactor. A smooth and continuous flow of polyester granules must be maintained. Agglomeration of polyester granules and sticking of granules to the reactor walls interferes with smooth flow and makes discharge of the granules from the reactor difficult. Therefore, the temperature of the granules must be maintained sufficiently low to prevent agglomeration but high enough to achieve an acceptable polymerization rate.

Since the primary function of the purge gas is to carry off unwanted reaction by-products, its flow rate should be just sufficient to effectively remove the reaction by-products. Excessive -Flow rate results in high costs of supply, regeneration, and disposal.

Small granules or pellets of polyester result in faster polymerization but have a greater tendency to agglomerate. Partially crystallizing the granules helps reduce agglomeration. It is, therefore, important to achieve a proper balance of reaction temperature, velocity of downward movement of polymer granules, prepolymer properties and other process conditions for successful commercial operation.

Conventional static bed solid state polymerization processes use a single reactor for each processing line. A single reactor is satisfactory for producing polyester with an increase of molecular weight by an amount up to that corresponding to an intrinsic viscosity increase of about 0.25 to 0.3 dl/g. They are, however, limited in ability to increase molecular weight because of the inability to achieve sufficient reactor residence time. Growing demand has given rise to a need for a process that can achieve higher molecular weight resins.

I have discovered a process that uses two or more static bed reactors in series to achieve polyester molecular weight increases greatly above those previously possible while avoiding unwanted agglomeration and other undesirable side effects.

SUMMARY

In my process the molecular weight (herein indicated by intrinsic viscosity, a conventional measure of polyester molecular weight) of polyester resin can be increased by as much 0.5 dl/g in a two reactor system and even greater in more than two reactors. The process is not only economical but produces polyester with very low levels of acetaldehyde and other undesirable reaction by-products.

The process requires solid state polymerization of polyester prepolymer resin in at least two static bed reactors. It is generally preferred to increase the temperature of the polyester resin between each succeeding reactor.

More specifically the invention is a continuous solid state polymerization process comprising: (1) feeding granules of a polyester into a first reactor in a series of reactors wherein the granules flow from top to bottom of the reactor as a moving bed in a stream of purge gas, and wherein the polyester granules are maintained at a temperature which results in an ASI index within the range of from about 2 to about 20; (2) withdrawing polyester granules from the reactor; (3) feeding the polyester granules into the next reactor in series wherein they flow from top to bottom of the reactor as a moving bed, in a stream of purge gas, wherein the polyester granules are maintained at a temperature which results in an ASI index within the range of about 2 to about 20; and (4) repeating steps (2) and (3) through the series of reactors, and wherein the ASI index is equal to $Xc(Tm-Tr)$, where $Xc$ is the fractional crystallinity, $Tm$ is the melting point in degrees C, and $Tr$ is the temperature in degrees C of the polyester granules in the reactor, and wherein the intrinsic viscosity of the polyester is increased by a total of at least about 0.25 dl/g.

DETAILED DESCRIPTION

Figure 1:
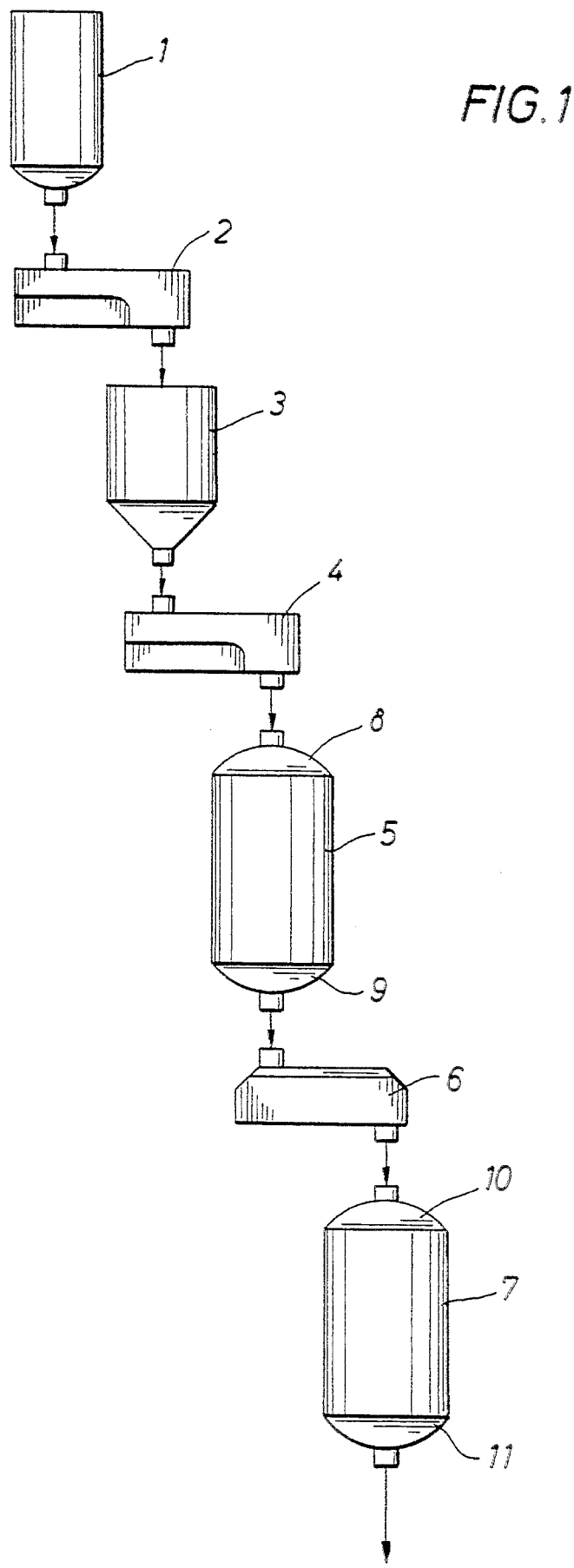
FIG. 1 is a diagrammatic view of equipment which can be used in the process of this invention.

There are two important requisites for successful operation of a continuous solid state polymerization process. First, a steady uninterrupted flow of polymer granules must be maintained to ensure smooth operation. Agglomeration or sticking of polymer granules must be avoided because it impedes flow of polymer granules and causes process upsets. Secondly, a suitable combination of reactor residence time and temperature is required to achieve the desired product molecular weight, as indicated by its intrinsic viscosity ("IV"). Since reaction rate increases with increasing temperature, and product IV increases with increasing residence time, desired product IV can be attained by using relatively long residence time with relatively tow temperature or relatively short residence time with relatively high temperature. However, the combination of reactor residence time and temperature must be chosen to avoid lumping or sticking of polymer granules.

The invention is better understood by an explanation of how polymer sticking takes place inside the reactor and how it can be avoided. Factors affecting polymer sticking include temperature, polymer particle size, bed height, velocity of downward flow of polymer granules (granule velocity), and polymer morphology.

At solid state polymerization conditions, polyester is only partially crystalline (with 30 to 70% crystallinity). Such polyester is not a rigid body, but rather, it is leathery and slightly tacky. Since tackiness of polymer increases with increasing temperature, the sticking tendency of polyester granules also increases with increasing temperature.

Consider a fixed bed of polyester granules held motionless inside a solid state polymerization reactor. At polymerization temperatures and under compaction pressure of the weight of the polymer bed, polymer granules creep into one another at contact points. In time, polymer granules agglomerate to form big lumps. The most effective way to prevent lumping is to constantly renew the inter-granular contact areas so that polymer granules do not have a chance to creep into one another. This is done by maintaining constant flow of polymer granules at sufficiently high velocity. Constant granule flow is also an essential requirement of a continuous solid state polymerization process.

Since polymer sticking tendency increases with increasing specific surface area (surface area per unit mass) or, more precisely, specific contact area of polymer granules, it also increases with decreasing particle size of polymer granules. Although polymerization proceeds faster with smaller particles, lower temperature is required to counteract the higher sticking tendency, resulting in little, if any, gain in polymerization rate. In fact, if the particle size is reduced below certain limits, agglomeration occurs at any practical polymerization temperature. Thus it has been found that suitable particle size polymer granules for commercial solid state polymerization is between 0.01 to 0.05 gram per granule.

Within a static bed, the compaction pressure a polymer granule experiences is approximately proportional to the weight of the polymer granules in the bed which, in turn, is proportional to the bed height above the granule. Thus polymer sticking tendency is highest at the bottom of the bed and lowest at the top. As a result, lumping of polymer granules usually starts near the bottom of the bed. For this reason there is a practical limit on the bed height of a solid state polymerization reactor.

At sufficiently high flow velocity, polymer granules change their positions, albeit only slightly, relative to each other (by sliding, for example), and are thereby prevented from forming lumps. In addition, I have determined that the flow of polymer granules can significantly reduce the specific contact area of granules as indicated by the fact that a moving bed has a lower bulk density than a fixed bed. Of course, lower bulk density also results in a lower compaction pressure. Since the rate of changes of contact areas of polymer granules and the reduction in the bulk density of the bed increase with increasing granule velocity, polymer sticking tendency within the reactor decreases with increasing granule velocity. For every combination of reactor temperature, bed depth, and particle size, there exists a minimum granule velocity necessary to prevent sticking. For any given size and shape of polymer granule, the minimum velocity increases with increasing temperature and bed height. Thus a higher granule velocity is required for a higher polymerization temperature or greater bed height. For a pilot scale reactor, which is usually no more than 12 feet(3.6 meters) high, granule velocity of less than 1 foot (0.3 meters) per hour can be used without polymer sticking. For commercial scale reactors, which are conventionally more than 25 feet (7.6 meters) high, a granule velocity of at least 2 feet (0.6 meters) per hour is generally required.

Polymer granules which are initially moving freely in a moving bed can stick and form lumps if the temperature or the bed height is increased or if the granule velocity is decreased. A well designed commercial scale must be capable of continuously producing products of desired IV's at a sufficiently high throughput. Conventional continuous solid state polymerization processes use a single reactor 25 to 50 feet (7.6 to 15.2 meters) in height. The reactor is operated at a temperature between 200° C. and 230° C. and a polymer moving velocity of 2 to 10 feet per hour (0.61 to 1.52 meters per hour). Within these ranges of temperature, bed height, and granule velocity, a most suitable combination of the three variables is chosen to produce product with the desired IV. The conventional process is capable of producing polyethylene terephthalate (PET) product resin with an IV between 0.72 to 0.84 dl/g, using PET prepolymer with an IV between 0.55 to 0.65 dl/g. (Such polymers are very useful for PET bottle applications). Conventional processes can increase polymer IV by about 0.12 to 0.25 dl/g. For other applications (e.g., PET with IV's between 0.95 and 1.05 dl/g for food tray and tire cord applications) using PET prepolymer with a typical IV (i.e., 0.55 to 0.65 dl/g), it is necessary to increase IV by more than 0.25. This cannot be achieved in a conventional continuous solid state polymerization process, which uses a single reactor. In a conventional process, there are two ways to raise the product IV; namely, increasing the reactor temperature or increasing the reactor residence time. The reactor residence time is constrained by bed height and granule velocity. It can be increased by either increasing the bed height or by decreasing granule velocity. Increasing the reactor diameter allows an increase in the throughput rate but not in residence time at constant granule velocity. If reactor temperature is raised to increase reaction rate, polymer sticking tendency will increase. To prevent polymer sticking, bed height must be decreased or granule velocity increased. However, either measure reduces reactor residence time and offsets the effect of the temperature increase. Alternatively, increasing the reactor residence time either by increasing the bed height (assuming there is a sufficient reactor height) or by reducing the granule velocity results in increased polymer sticking tendency. To prevent polymer sticking, the reactor temperature must be lowered, again offsetting the effect of the increased residence time on the product IV.

These constraints limit the ability of the conventional single-reactor continuous solid state polymerization process to increase polymer IV.

In my invention, two or more reactors in series may be used. Each reactor used in this improved process may be as tall as the single reactor used in the conventional process. This new process provides greatly increased residence time, thereby enabling an increase in the polymer IV. Moreover, this new process permits the use of progressively higher temperatures in subsequent reactors, which increases overall polymerization rate with concomitant increase in process efficiency.

Polymer morphology, especially melting point and crystallinity, is important in determining sticking tendency of polyester granules. A measure that is useful to determine optimum reactor temperature has been devised to determine relative ability of the polyester to resist sticking. The degree of crystallization of the prepolymer is one of the more important factors in the prevention of agglomeration. Generally, desirable crystallinity ranges from about 30 to about 70%.

During polymerization, the polyester granules consist of amorphous regions and crystalline regions. Since, at polymerization temperatures, the amorphous fraction is thermodynamically an extremely high viscosity melt, the crystalline fractions help prevent sticking of the polyester granules. Therefore, the ability of the polyester to resist sticking increases with increasing degrees of crystallinity. At the melting point of the polyester, Tm, the crystallinity and the ability to resist sticking disappears. Even below Tm, the rigidity of the granules decrease and tackiness increases as temperature approaches the melt temperature.

Using these factors, an anti-sticking index (ASI) is defined by the following relationship:

$$ASI = Xc(Tm - Tr) \quad (1)$$

where Xc is the fraction of crystallinity of the polyester during solid state polymerization and Tr is the temperature in degrees C of the polyester. Xc is determined from the density of the polyester, D, according to the following equation:

$$Xc = (D - Da)/(Dc - Da) \quad (2)$$

where Da (1.335 g/cm$^3$) is the density of the amorphous region and Dc (1.455 g/cm$^3$) is the density of the crystalline region. The ASI is a good measure of the relative ability of the polyester to resist sticking and relationship (1) is used as a guide to determine the most suitable polymerization temperature.

The minimum ASI required to ensure stick-free operations will vary with equipment and operating conditions and will generally be in the range from 12° C. to 20° C. for commercial operations. During solid state polymerization at a constant temperature, the ASI of the polyester increases gradually with time, primarily due to a gradual increase in Xc and to a lesser extent to an increase in Tm. Therefore, after polymerization at a given temperature for a time, temperature can be significantly increased, especially if raised after polymer exits the bottom of one reactor and enters the top, of another since the compaction pressure is also lower. My invention exploits this discovery by providing a multiple reactor system operating in series at progressively increasing temperatures.

The invention is applicable to virtually any polyester which can be solid state polymerized. The most common polyesters suitable for use in the invention have at least about 75 mole percent of their acid moieties provided by an aromatic dicarboxylic acid, such as terephthalic acid, isophthalic acid, or a naphthalenic dicarboxylic acid (preferably 2,6-) with the diol moieties provided by glycols such as ethylene glycol, butylene glycol, 1,4-dimethylol cyclohexane and the like or aromatic diols such as hydroquinone and catechol. Such polyesters can contain other dicarboxylic acids such as adipic acid, isophthalic acid, sebacic acid, and the like. Polyethylene terephthalate, polyethylene isophthalate, polyethylene naphthalate, and polybutylene terephthalate homopolymers are representative examples of such polyesters. Blends of various polyesters can also be polymerized in the process. For instance, it can be utilized for melt blends of polyethylene terephthalate and polyethylene isophthalate. Such blends of polyethylene terephthalate and polyethylene isophthalate have excellent gas barrier properties and are useful in making beverage bottles and other packaging materials (see U.S. Pat. 4,551,368).

The polyester prepolymers (starting polyesters) utilized in this invention can be made in any manner but are typically prepared by conventional melt polymerization techniques. These polyester prepolymers have an initial starting IV of at least about 0.2 dl/g as measured in a 60:40 (by weight) phenol: 1,1,2,2-tetrachloroethane solvent system at a temperature of 30° C. The polyester prepolymers should generally have a starting IV of from about 0.35 to about 0.75 dl/g. A lower limit of 0.35 dl/g is useful because it has been found that that is about the limit which PET can be pelletized without shattering. The prepolymers will normally have a starting IV in the range of 0.5 to 0.7 dl/g, and preferably in the range of about 0.55 to about 0.65 dl/g.

The rate at which polyethylene terephthalate prepolymer can be solid state polymerized also depends on the carboxyl end group content of the prepolymer. Generally, prepolymers having a carboxyl end group content within the range of about 18% to about 40% achieve maximum solid state polymerization rates. It is preferred for such prepolymers to have a carboxyl end group content within the range of about 24% to 33%. U.S. Pat. No. 4,238,593 describes this relationship in greater detail and its teachings are incorporated herein by reference.

Suitable polyester prepolymers which can be solid state polymerized using my invention are comprised of one or more diacid components and one or more diol components. The diacid component in the polyesters are normally alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 2.2 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. A representative example of such adiester of an alkyl dicarboxylic acid is azelaic acid. The preferred aryl dicarboxylic acids contain from 8 to 16 carbon atoms. Some representative examples of aryl dicarboxylic acids are terephthalic acid, isophthalic acid, and orthophthalic acid. The preferred diesters of aryl dicarboxylic acids contain from 10 to 18 carbon atoms. Some representative examples of diesters of aryl dicarboxylic acids include diethyl terephthalate, diethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component of the polyester prepolymers is normally comprised of glycols containing from 2 to 12 carbon atoms, glycol ethers containing from 4 to 12 carbon atoms, and polyether glycols having the structural formula HO—(A—O)$_n$—H wherein A is an alkylene group containing from 2 to 6 carbon atoms and wherein n is an integer from 2 to 400. Generally, such polyether glycols will have a molecular weight of 400 to about 4000.

Preferred glycols normally contain from 2 to 8 carbon atoms and more preferably from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, and 2,2,4,4-tetramethyl-1,3-cyclobutane diol. Some representative examples of polyether glycols that can be used include polytetramethylene glycol (Polymeg TM) and polyethylene glycol (Carbowax TM).

Branched polyester prepolymers can also be solid state polymerized in the process of the present invention. Such branched polyesters normally contain branching agents which have three or more functional groups and preferably three or four functional groups. Reactive functional groups can be carboxyl groups or aliphatic hydroxyl groups. The branching agent utilized in such branched polyesters can optionally contain both carboxyl groups and hydroxyl groups. Examples of acidic branching agents include trimesic acid, trimellitic acid, pyromellitic acid, butane tetracarboxylic acid, naphthalene tricarboxylic acids, and cyclohexane-1,3,5-tricarboxylic acids. Some representative examples of hydroxyl branching agents (polyols) include glycerin, trimethylol propane, pentaerythritol, dipentaerythritol, 1,2,6-hexane triol, and 1,3,5-trimethylol benzene. Generally, from 0 to 3 percent of a polyol containing from 3 to 12 carbon atoms will be used as the branching agent (based upon the total diol component).

High strength polyesters which utilize at least one bis-hydroxyalkyl pyromellitic diimide in their diol component can also be solid state polymerized. The diol component in these polyesters will normally contain from 5 to 50 mole percent of one or more bis-hydroxyalkyl pyromellitic diimides and will preferably be comprised of from 10 to 25 mole percent of at least one bis-hydroxyalkyl pyromellitic diimide. The remaining portion of the diol component is comprised of additional copolymerizable diols. Such polyesters are described in greater detail in U.S. Pat. No. 4,605,728, which is incorporated herein by reference in its entirety.

Referring to FIG. 1 polyester prepolymer granules can be stored in a feed resin surge bin 1. The granules are fed from the feed resin surge bin 1 to a crystallizer 2. It is generally convenient to crystallize the polyester granules by heating to a temperature at which crystallization occurs.

Crystallization can be conducted in any suitable equipment in which the polyester granules can be heated to crystallization temperatures without sticking. Agitation normally helps prevent sticking. For instance, a Solidaire processor or Torusdisc processor manufactured by Bepex Corporation can be utilized. Crystallization is preferably carried out in a fluidized bed crystallizer. Fluidization is accomplished by utilizing a gas flow rate sufficient to cause the polyester granules to be fluidized in the crystallizer with or without mechanical vibration. Purge gas or air can be used. Since very large quantities are required for fluidization, air is most economical. Crystallization can generally be accomplished at residence times in the range of about 2 to about 20 minutes and preferably from about 5 to about 10 minutes. In the case of polyethylene terephthalate resin, heating is achieved by air at temperatures in the range of about 140° C. to about 215° C. and preferably in the range of about 190° C. to about 200° C.

Residence time to crystallize the polyester granules to the desired level depends on the crystallization temperature; low crystallization temperature requires longer crystallization time. In general, polyethylene terephthalate prepolymer is crystallized to a density of at least about 1.37 g/cm$^3$. A density of at least about 1.38 g/cm$^3$ is preferred and 1.39 g/cm$^3$ more preferred.

The polyester granules can also be crystallized by vapor treatment described in U.S. Pat. No. 4,644,049 which, for the purposes of this invention, is incorporated herein by reference. Since vapor treatment crystallizes the polyester granules from the surface inward, a lower degree of crystallinity is required than for granules crystallized by a thermal treatment. Vapor treatment involves exposing the granules to the vapors of a suitable organic compound, such as chlorinated hydrocarbons, ketones, tetrahydrofuran, ethylene oxide, or propylene oxide. Methylene chloride and acetone are particularly preferred organic compounds.

The polyester granules can also be crystallized in a high frequency energy field ranging from about 20 megahertz to about 300 megahertz. Such a technique is described in greater detail in U.S. Pat. No. 4,254,253, which is incorporated herein by reference.

After being crystallized, it is generally convenient to feed the granules into a preheater surge bin 3. To keep the polyester granules hot, it is generally desirable to feed hot nitrogen from the second reactor into the preheater surge bin. The crystallized polyester granules can optionally be dried after exiting the crystallizer. However, drying it is not necessary and it is less costly to polymerize "wet" polyester. U.S. Pat. No. 3,718,621 describes a process wherein polyester resin which has not been previously dried is solid state polymerized in a moving bed reactor. The procedure described in U.S. Pat. No. 3,718,621 for solid state polymerizing polyester resin which has not been dried is hereby incorporated by reference. The polyester granules typically have a residence time in the preheater surge bin of 1 to 10 hours, preferably 2 to 4 hours.

After exiting the preheater surge bin, polyester prepolymer resin is fed into a preheater, typically, a fluidized bed. It can be the same type equipment as the crystallizer but operated at a higher temperature. For example, in a fluidized bed preheater, the gas used will be at a temperature in the range of about 180° C. to about 275° C. and preferably in the range of 220° C. to about 260° C. The fluidized bed preheater residence time of about 2 to about 20 minutes is preferred and will more preferably be about 5 to about 10 minutes.

A fluidized bed preheater utilizing air is very suitable; however, other heating apparatus can be used. For instance, heating devices which heat the polyester by conduction and/or convection can be employed. Thermascrew or Torusdisc heaters manufactured by Bepex Corporation can be used. The polyester granules will normally be preheated to a temperature which is within the range of about 170° C. to about 235° C., preferably a temperature in the range of about 200° C. to about 230° C. PET resin will more preferably be preheated to a temperature in a range of about 210° C. to about 230° C.

The preheated polyester granules are passed into the top of the first reactor 5 and pass through the first reactor as a moving bed. The rate of granule flow through the reactor is controlled by regulating discharge from the reactor. Polymerization is conducted in a stream of purge gas. In order to ensure uniform gas flow and to prevent bypassing, a device for dispersing the purge gas is generally used. Gas flow well below the turbulent is preferred in order that the polyester granules not be fluidized. Plug flow (i.e. flow without significant variance of velocity across the reactor cross section) is required for successful operation. The gas flow rate in each of the reactors in series will normally be approximately equal. It is preferred that the rate in any reactor not exceed 1.5 times (more preferably 1.25 times) the rate in any other reactor in a reactor series. It is most advantageous to feed the purge gas through the bottom of the reactor and pass it upward through the reactor countercurrent to the polymer flow. Although a co-current purge gas flow can be used, it is less efficient and generally requires a higher flow rate.

The reactor can be of any design that will allow the polyester granules to be maintained at the desired temperature and residence time to allow for removal of reaction by-products, glycol, water and acetaldehyde. Suitable purge gases for use in the solid state polymerization process of this invention include nitrogen, carbon dioxide, helium, argon, neon, krypton, xenon, air and certain industrial waste gases and combinations or mixtures thereof. Nitrogen is preferred.

Reactor design is not critical and cylindrical reactors are generally used. Polymerization temperature in the range from just above the threshold polymerization temperature to a temperature within a few degrees of the polymer sticking temperature (which may be well below the melting point of the polyester) is appropriate. When polymerizing PET homopolymer, a temperature in the first reactor within the range of about 170° C. to about 235° C. and preferably in the range of about 200° C. to about 230° C. is suitable. Temperatures about 210° C. to about 230° C. are even more preferred. Modified PET copolymers containing from about 1 to about 3 mole percent isophthalic acid, based on total acids, are polymerized at about 5 degree lower temperatures. Such copolyesters are less crystalline and have a greater propensity to stick at polymerization temperatures.

After exiting the bottom of the first reactor 9, it is preferred to increase the temperature. This is accomplished in reheater 6. The reheater can be any suitable heating device, such as a Thermascrew heater, a Torusdisc process, or a fluidized bed heater. The Torusdisc processor manufactured by Bepex Corporation is suitable. It is preferred that the polyester granules be heated to a temperature that is about 2° C. to about 20° C. (more preferably about 5 to about 10 degrees) higher than the temperature at which it exited the previous reactor. Higher temperatures can be employed in subsequent reactors in the reactor series. This is possible because of increased crystallinity and higher melting points (higher ASI) that occur in each reactor. After exiting the first reactor or the preheater, the polyester granules enters the top of the second reactor 10. The second reactor can be the same design as the first reactor. It is also operated in the same manner as the first reactor except for temperature. After polymerization in the second reactor for the desired residence time, the intrinsic viscosity of the polyester resin will have increased by at least about 0.25 dl/g and preferably at least 0.30 dl/g. This procedure can be repeated for each additional reactor in sequence.

It is desirable that the polyester resin from the last reactor be cooled in a fluidized bed or a mechanically agitated heat exchanger. The cooler will cool the resin to a temperature of about 50° C. to about 70° C. for storage and/or packaging.

This invention is illustrated by the following examples which are included for illustration of, but not limiting of, the scope of the invention or the manner in which it is practiced. Unless specifically indicated otherwise, all parts and percentages are given by weight.

Illustrative Embodiment 1

For this example, experiments were conducted in a continuous solid state polymerization pilot plant. The pilot plant consists of a feed hopper, a crystallizer, a preheater surge bin, a preheater, a reactor, and a product cooler. The crystallizer, preheater, and product cooler are vibrating fluid beds that use air as the heat transfer medium. The reactor is an insulated cylindrical vessel of 24 inches (61 cm) outside diameter and 12 feet (3.5 m) height. The maximum reactor capacity is about 35 cubic feet (1 cubic meter) or 2,000 lbs (907 kg) of polymer. The reactor rests on load cells which measure reactor weight. At the bottom of the reactor, there is a product discharger, a mechanical discharging device whose rotating speed is used to control discharge of polymer from the reactor. The reactor is also equipped with a gas distribution ring near the bottom.

Between each two vessels, there is a rotary airlock to isolate the gas stream through each vessel. The feed hopper and the preheater surge bin are each equipped with a screw feeder at the bottom to control the feed rates to the crystallizer and to the preheater. Polymer bed depth and polymer flow rate is controlled by the feed rate of the screw feeder at the bottom of the preheater surge bin and the discharge rate of the product discharger. Also, there is a temperature element at or near the outlet of each vessel to monitor polymer temperature at each stage of the process.

In operation, polyester granules are fed into the crystallizer from the feed hopper. A stream of hot air through the bottom of the crystallizer heats the polymer to about 180° C. and crystallizes the polymer to a crystallinity of about 40%. The crystallizer provides a residence time of about 15 minutes. The crystallized polymer is dropped into the preheater surge bin, purged with a stream of reactor exhaust nitrogen, and reheated to 180° C. Polymer exiting the bottom of the surge bin is fed into a screw feeder. Inside the preheater, the granules are heated to the desired temperature by a stream of hot air for about 15 minutes. The preheated granules are dropped into the reactor and move downward by gravity. A stream of nitrogen, also preheated to the same temperature, passes through the nitrogen distribution ring near the bottom of the reactor and into the reactor to remove the reaction by-products. Nitrogen exiting the reactor is directed to the preheater surge bin. Product is discharged into the product cooler and is cooled by a stream of cold air to below 65° C.

Experiments were conducted in three parts. The first demonstrated the limitation in reactor temperature in a conventional single-reactor process, the second simulated the improved process with two reactors in series at the same temperature, and the third demonstrated the improved process with two reactors with higher temperatures in the second reactor. In all experiments, reactor bed height was maintained at about 7.2 feet (2.2 m) with 1200 lbs (907 kg) of polymer inside the reactor and a throughput rate of 100 lbs/hr (45 kg/hr) during steady state operations. This gave a reactor residence time of about 12 hours and a bed moving velocity of about 0.6 ft/hr (18.3 cm/hr). This velocity could be used without polymer sticking because bed height was only 7.2 feet (2.2 m).

PET pellets with an IV of 0.59 dl/g and a normal DTA melting point of 253.0° C. were used. Pellet size was 1.83 grams per 100 pellets.

For the first part, reactor temperature was controlled at 216° C. for 24 hours. The process went smoothly at this temperature. After steady state was established, product IV reached 0.759 dl/g.

Reactor temperature was increased to 223° C. and then to 226° C. without any sign of polymer sticking. The steady state product IV's were 0.815 dl/g and 0.878 dl/g, respectively. Reactor temperature was further increased to 232° C. Twelve hours later, when all the reactor product had been subject to the temperature increase, the product IV reached 0.938 dl/g. However, in another 2 hours, marble-size lumps were coming out the reactor, a positive sign of polymer sticking. It was apparent that the maximum allowable reactor temperature had been exceeded. The reactor temperature was reduced to 226° C. to prevent further polymer agglomeration and to run out the small lumps already formed inside the reactor. After 14 hours of operation at 226° C., the polymer lumps had completely disappeared from the reactor product and the product IV Stabilized at about 0.880 dl/g. This final reactor temperature was considered the maximum temperature for stable operation. The process was continued at this reactor temperature for one week, producing about 17,000 lbs (7711 kg) of product for use in the second and third parts of the experiment.

The first part of the illustrative embodiment shows the existence of a maximum allowable reactor temperature and maximum attainable product IV in the conventional single-reactor process with a fixed reactor bed height and bed velocity. In this case, the maximum allowable reactor temperature was about 226° C. and the maximum attainable IV was about 0.880 dl/g with a reactor bed height of 7.2 feet (2.2 m) and a velocity of 0.6 ft/hr (18.3 cm/hr) using a prepolymed with an IV of 0.59 dl/g. The maximum temperature and attainable product IV are considerably higher than achievable in a commercial process operated at a reactor bed height of about 30 feet (9.1 m).

In the second part the product produced in the first part, with an average IV of 0.880 dl/g, was passed through the reactor to simulate the most basic form of the improved process with two reactors in series, both operated at the same temperature. The first-pass product, with an average IV of 0.880 dl/g, was heated in the crystallizer to 180° C. and held in the preheater surge bin for two hours at 180° C. with nitrogen from the reactor being used to keep the resin hot. The polymer was heated in the preheater to 226° C. and fed into the reactor. The polymer bed height and velocity were the same as for the first part of the experiments. The run, which lasted 2 days, proceeded smoothly without any sign of polymer sticking. The product IV reached 1.011 dl/g.

The relatively mild and short treatments the polymer received in the crystallizer, the preheater surge bin, and the preheater in this second-pass operation did not significantly change its crystallinity or melting point. Therefore, as far as the sticking tendency and the processability are concerned, this two-pass operation closely simulated the operation of a solid state polymerization line with to reactors in series.

The third part was similar to the second except higher second-pass reactor temperatures were used to demonstrate the additional advantages of the invention. Three progressively higher second-pass reactor temperatures, 232° C. 237° C. and 242° C., were used without polymer sticking. The operation at each temperature was allowed to run for 24 hours. The average second-pass product IV's were 1.048 dl/g, 1.107 dl/g and 1.132 dl/g, respectively for these three reactor temperatures. Further increase in the reaction temperature to 247° C. resulted in partial melting of polymer, that formed huge lumps inside the preheater. The experiment was terminated. This demonstrated the feasibility of operating the improved multi-reactor system with progressively higher reactor temperatures to increase the product IV to progressively higher values. Because a bed depth of only about 7.2 feet (2.2 m) was used, a much lower granule flow rate and much higher solid state polymerization temperature were possible than could be used in commercial scale operation.

Illustrative Embodiment 2

This embodiment was carried out utilizing a commercial scale solid state polymerization line having the design shown in FIG. 1. Polyester prepolymer in the form of cubes weighing about 0.05 gram per cube and having an intrinsic viscosity of 0.62 dl/g were fed from a feed resin surge bin to a fluidized bed crystallizer. Air was used to fluidize the bed of polyester granules in the crystallizer. Air entered the crystallizer at a temperature of about 185° C. and the granules were maintained in the crystallizer for a residence time of 5 to 10 minutes. The crystallized PET exited the crystallizer at about 180° C. and into a preheater surge bin where it was maintained for 3 to 4 hours at a temperature of about 180° C. Hot nitrogen from the second solid state polymerization reactor was passed through the bed of resin in the preheater surge bin to keep it hot.

Polyester granules were continuously fed from the preheater surge bin into a fluidized bed preheater. Air at about 240° C. was used to heat the granules. In the preheater the resin reached a temperature of about 222° C. after 5 to about 10 minutes. The "wet" resin was fed from the preheater into the top of a first static bed reactor. The resin was dried, crystallized to a higher density, and polymerized to a higher intrinsic viscosity in the first reactor. Thus, the first reactor functioned as a dried/reactor. The resin was maintained in the first reactor at a bed depth of about 25 feet for about 15.5 hours. Nitrogen was introduced into the bottom of the first reactor at 205° C. to 240° C. The granules exited the bottom of the first reactor at about 222° C. The PET granules were fed to a Torusdisc preheater manufactured by Bepex Corporation and heated to about 227° C. The PET granules were then fed into the second reactor that had a bed height of about 30 feet (9.1 meters). Nitrogen was introduced into the bottom of the second reactor at 205° C. to about 240° C. After about 18.5 hours at about 227° C. the PET had reached an intrinsic viscosity of approximately 1.04 dl/g. Thus, the intrinsic viscosity was increased by 0.42 dl/g in the process. This system produced resin at a rate of 4200 lbs (1905 kg) per hour.

Variations in the present invention are possible in light of the description provided and it should be clear that changes can be made in the particular embodiments within the intended scope of the invention defined by the following claims.

What is claimed is:

1. A continuous solid state polymerization process comprising: (1) feeding granules of a polyester into a first reactor in a series of at least two static bed reactors wherein the granules flow from top to bottom of the reactor as a moving bed in a stream of purge gas and wherein the polyester granules are maintained at a temperature which results in an ASI index within the range of from about 2 to about 20; (2) withdrawing polyester granules from the reactor; (3) feeding the polyester granules into the next reactor in the series of at least two static bed reactors wherein the polyester granules flow from top to bottom of the reactor as a moving bed, in a stream of purge gas, wherein the polyester granules are maintained at a temperature which results in an ASI index within the range of about 2 to about 20, and (4) repeating steps (2) and (3) through the series of reactors, and wherein the ASI index is equal to $X_c(T_m-T_r)$, where $X_c$ is the fractional crystallinity, $T_m$ is the melting point in degrees C., and $T_r$ is the temperature in degrees C of the polyester granules in the reactor, and wherein the intrinsic viscosity of the polyester is increased in the series of reactors by a total of at least about 0.25 dL/g as measured in a solution comprising 60%w phenol and 40%w 1,1,2,2-tetrachloroethane based on total weight of solvent at a temperature of about 30° C.

2. The process of claim 1 wherein the polyester granules fed the first reactor have an average fractional crystallinity in the range of 0.30 to 0.70.

3. The process of claim 1 wherein the granules of polyester move through each moving bed reactor at an average velocity in the range of 0.6 to 3.0 meters per hour.

4. The process of claim 1 wherein the purge gas flow rate in each of the reactor does not exceed a multiple of 1.5 times the gas flow rate in any other reactor in the series.

5. The process of claim 2 wherein the granules of polyester move through each moving bed at an average velocity of 0.6 to 3.0 meters per hour, the purge gas flow rate in each of the reactors does not exceed a multiple of 1.5 times the gas flow rate in any other reactor in the series, the polyester granules fed into the top of the first reactor has been previously crystallized to a density of at least about 1.37 g/cm, the granules in each subsequent reactor are at a temperature about 2° C. to about 20° C. higher than the temperature of the granules in the next preceding reactor, the polyester granules fed to the first reactor have an intrinsic viscosity within the range of about 0.35 dl/g to about 0.75 dl/g, the bed depth of the polyester granules in each reactor is within the range of about 9.1 meters to about 15.2 meters and the moving bed of polyester granules flows at a velocity of about 0.6 meters per hour to about 3 meters per hour.

6. A continuous solid state polymerization process which comprises: (1) feeding granules of a polyester into the top of a first reactor in which the granules flow from top to bottom of the first reactor as a moving bed in a counter current flow of an inert gas at a gas flow rate insufficient to cause fluidization of the polyester granules, and wherein the polyester granules are maintained at a temperature sufficient to promote solid state polymerization; (2) withdrawing polyester granules from the bottom of the first reactor; and (3) feeding the polyester granules which are withdrawn from the first reactor into the top of a second reactor wherein the granules of the polyester flow from top to bottom of the second reactor as a moving bed, in a countercurrent stream of an inert gas at a gas flow rate insufficient to cause fluidization of the moving bed of polyester granules, wherein the polyester granules are maintained at a temperature which is sufficient to promote solid state polymerization; wherein the intrinsic viscosity of the polyester is increased by a total of at least about 0.25 dL/g as measured in a solution comprising 60%w phenol and 40%w 1,1,2,2-tetrachloroethane based on total weight of solvent at a temperature of about 30° C., during solid state polymerization in the two reactors.

7. The process of claim 6 wherein the polyester is polyethylene terephthalate.

8. The process of claim 6 wherein the granules being solid state polymerized are at a temperature within the range of about 170° C. to about 235° C.

9. The process of claim 7 wherein the temperature is within the range of about 210° C. to about 230° C.

10. The process of claim 6 wherein the granules being solid state polymerized in the second reactor are at a temperature which is about 2° C. to about 20° C. higher than the temperature of the granules being solid state polymerized in the first reactor.

11. The process of claim 9 wherein the polyester granules fed into the top of the first reactor has been previously crystallized to a density of at least about 1.37 g/cm$^3$.

12. The process of claim 9 wherein the polyester granules fed into the top of the first reactor has been previously crystallized to a density of at least about 1.39 g/cm$^3$.

13. A process as specified in claim 11 wherein the granules in the second reactor are at a temperature about 2° C. to about 20° C. higher than the temperature of the granules being solid state polymerized in the first reactor.

14. The process of claim 6 wherein the polyester granules fed to the first reactor have an intrinsic viscosity within the range of about 0.35 dl/g to about 0.75 dl/g.

15. The process of claim 9 wherein the polyester granules fed into the first reactor have an intrinsic viscosity within the range of about 0.55 dl/g to about 0.65 dl/g.

16. The process of claim 8 wherein the bed depth of the polyester granules in each reactor is within the range of about 9.1 meters to about 15.2 meters.

17. The process of claim 8 wherein the moving bed of polyester granules flows at a rate of about 0.6 meters per hour to about 3 meters per hour.

18. The process of claim 16 wherein the bed depth of polyester granules in each reactor is within the range of about 10.7 to about 13.7 meters.

19. The process of claim 17 wherein the moving bed of polyester granules flows at a velocity of about 0.6 meters per hour to about 3 meters per hour.

20. The process of claim 8 wherein the intrinsic viscosity of the polyester is increased by a total of at least about 0.4 dl/g.

21. The process of claim 7 wherein the temperature is within the range of about 200° C. to about 230° C.

22. The process of claim 7 wherein the intrinsic viscosity of the polyester is increased by a total of at least about 0.30 dl/g during solid state polymerization in the two reactors.

23. The process of claim 7 wherein the purge gas is nitrogen.

24. An improved process for increasing the molecular weight of a polyester by continuous solid state polymerization wherein polyester prepolymer granules having an initial crystallinity as determined by density of at least about 1.37 gm/cm$^3$ and an initial intrinsic viscosity of from about 0.35 dl/g to about 0.75 dl/g, as measured in a solution comprising 60 wt % phenol and 40 wt% 1,1,2,2-tetrachloroethane based on total weight of solvent at a temperature of about 30° C., are continuously fed to and removed from a static bed reactor wherein the polyester granules are maintained in the reactor at a temperature sufficient to promote solid state polymerization by the addition of a purge gas to the reactor, the improvement comprising conducting the solid state polymerization of the polyester granules in a series of at least two static bed reactors.

25. The process of claim 24 wherein the polyester prepolymer has an intrinsic viscosity of about 0.55 to about 0.65 dl/g.

26. The process of claim 24 wherein the polyester prepolymer has a density of at least about 1.38 g/cm$^3$.

27. The process of claim 24 wherein the second static bed polymerization reactor is operated at a higher temperature than the first static bed polymerization reactor.

28. The process of claim 27 wherein the three static bed polymerization reactors are used in series, and the third reactor is operated at a higher temperature than the second reactor.

29. The process of claim 27 wherein the polyester prepolymer comprises polyethylene terephthalate (PET) prepolymer.

30. The process of claim 27 wherein the polyester prepolymer is a polyethylene naphthalate (PEN) prepolymer.

31. The process of claim 29 wherein the polyester prepolymer has a carboxyl end group content within the range of about 18% to about 40%.

32. The process of claim 29 wherein the polyester prepolymer has a carboxyl end group content within the range of about 24% to 33%.

33. The process of claim 24 wherein a nitrogen purge gas is passed in countercurrent flow through each reactor.

34. The process of claim 27 wherein the temperature of the polymer exiting a reactor is increased in a reheater prior to entering a subsequent reactor.

35. The process of claim 27 wherein the temperature of the polymer exiting a reactor is increased by about 2° C. to about 20° C. prior to entering a subsequent reactor.

36. The process of claim 24 wherein the intrinsic viscosity of the polyester prepolymer is increased by at least about 0.25 dl/g in the series of polymerization reactors.

37. The process of claim 27 wherein the intrinsic viscosity of the polyester prepolymer is increased by at least about 0.30 dl/g in the series of polymerization reactors.

38. The process of claim 27 wherein the intrinsic viscosity of the polyester prepolymer is increased by at least about 0.5 dl/g in the series of polymerization reactors.

39. A product of the process of claim 37 wherein the polyester product has an intrinsic viscosity greater than 1.0 dl/g.

* * * * *